United States Patent
Fan et al.

(10) Patent No.: US 10,991,252 B2
(45) Date of Patent: Apr. 27, 2021

(54) DRIVING ALARM SYSTEM, DRIVING ALARM METHOD AND ELECTRONIC DEVICE USING THE SAME

(71) Applicant: Wistron Corporation, New Taipei (TW)

(72) Inventors: Jia-Cyuan Fan, New Taipei (TW); Chi-Hsiang Yeh, New Taipei (TW); Mang-Chia Ho, New Taipei (TW)

(73) Assignee: Wistron Corporation, New Taipei (TW)

( * ) Notice: Subject to any disclaimer, the term of this patent is extended or adjusted under 35 U.S.C. 154(b) by 29 days.

(21) Appl. No.: 16/568,211

(22) Filed: Sep. 11, 2019

(65) Prior Publication Data

US 2021/0027630 A1 Jan. 28, 2021

(30) Foreign Application Priority Data

Jul. 22, 2019 (TW) .................. 108125821

(51) Int. Cl.
| | |
|---|---|
| *B60Q 1/26* | (2006.01) |
| *G08G 1/16* | (2006.01) |
| *G08G 1/017* | (2006.01) |
| *G08G 1/01* | (2006.01) |
| *B60W 50/14* | (2020.01) |

(52) U.S. Cl.
CPC .............. *G08G 1/166* (2013.01); *G08G 1/012* (2013.01); *G08G 1/0133* (2013.01); *G08G 1/0141* (2013.01); *G08G 1/0175* (2013.01); *B60W 2050/143* (2013.01)

(58) Field of Classification Search
CPC ...... G08G 1/166; G08G 1/012; G08G 1/0133; G08G 1/0141; G08G 1/0175; G08G 1/164; G08G 1/0145; G08G 1/0129; B60W 2050/143; G06N 3/08; G06N 20/00; G06N 5/046; G06N 3/0445; G06N 3/084; G06N 3/0454
USPC ................... 340/463, 435, 436, 903, 905
See application file for complete search history.

(56) References Cited

U.S. PATENT DOCUMENTS

| | | | | |
|---|---|---|---|---|
| 2007/0043502 | A1* | 2/2007 | Mudalige | B60T 7/22 |
| | | | | 701/301 |
| 2009/0192710 | A1* | 7/2009 | Eidehall | B62D 15/0265 |
| | | | | 701/301 |
| 2017/0200061 | A1* | 7/2017 | Julian | G06K 9/00791 |
| 2017/0217431 | A1* | 8/2017 | Class | B60R 21/0134 |
| 2018/0257647 | A1* | 9/2018 | Jurca | B60W 40/09 |
| 2019/0147260 | A1* | 5/2019 | May | G06K 9/6288 |
| | | | | 382/103 |
| 2019/0287404 | A1* | 9/2019 | Vernaza | G06N 7/005 |

* cited by examiner

*Primary Examiner* — Anh V La
(74) *Attorney, Agent, or Firm* — JCIPRNET (57) ABSTRACT

A driving alarm system, a driving alarm method and an electronic device using the same are provided. The driving alarm method includes: obtaining a driving trajectory of a vehicle in front; generating a driving trajectory matrix according to the driving trajectory; and outputting a warning message according to a dangerous level corresponding to the driving trajectory matrix.

18 Claims, 12 Drawing Sheets

DRIVING ALARM SYSTEM, DRIVING ALARM METHOD AND ELECTRONIC DEVICE USING THE SAME

CROSS-REFERENCE TO RELATED APPLICATION

This application claims the priority benefit of Taiwan application serial no. 108125821, filed on Jul. 22, 2019. The entirety of the above-mentioned patent application is hereby incorporated by reference herein and made a part of this specification.

BACKGROUND OF THE INVENTION

1. Field of the Invention

The present invention relates to an alarm system and method, and in particular to a driving alarm system, a driving alarm method and an electronic device using the same.

2. Description of Related Art

Most vehicles new in the market are equipped with various types of driving aids, among which the forward collision mitigation (FCM) system and the adaptive cruise control (ACC) system are most popular. The ACC system can obtain the distance between the vehicle and a vehicle in front through a distance sensor installed in the front of the vehicle. When the distance is too small, the ACC system can reduce the speed of the vehicle by controlling a braking system, for example, so as to keep the vehicle at a safe distance from the vehicle in front. However, the ACC system cannot assist a driver in judging whether the vehicle in front or on one side is driven dangerously.

SUMMARY OF THE INVENTION

In view of this, the embodiments of present invention provides a driving alarm system, a driving alarm method and an electronic device using the same, which can be used for assisting a driver in judging whether a vehicle in front or on one side is driven dangerously or has a dangerous driving record.

The embodiments of driving alarm method of the present invention is suitable for local electronic devices in vehicles. The driving alarm method comprises the following steps: obtaining a driving trajectory of a vehicle in front; generating a driving trajectory matrix according to the driving trajectory; and outputting a warning message according to a dangerous level corresponding to the driving trajectory matrix.

The embodiments of driving alarm system of the present invention comprises a local electronic device and a remote electronic device. The local electronic device obtains a driving trajectory of a vehicle in front, generates a driving trajectory matrix according to the driving trajectory, and uploads the driving trajectory matrix to the remote electronic device, wherein the remote electronic device judges a dangerous level of the vehicle in front according to the driving trajectory matrix and a neural network, and outputs a warning message or the dangerous level to the local electronic device according to the dangerous level.

The embodiments of driving alarm electronic device of the present invention comprises a transceiver, an output device, a data collection device and a processor. The processor is coupled to the transceiver, the output device and the data collection device. The processor is configured to: obtain a driving trajectory of a vehicle in front through the data collection device; generate a driving trajectory matrix according to the driving trajectory; upload the driving trajectory matrix and receive a dangerous level or warning message corresponding to the vehicle in front through the transceiver; and output the dangerous level or warning message through the output device.

Based on the above, the embodiments of driving alarm method of the present invention enables a vehicle to identify the dangerous level of the vehicle in front through the driving trajectory of the vehicle in front, thereby transmitting the warning message to a driver of the vehicle when the dangerous level is too high and reminding the driver to keep an appropriate distance from the vehicle in front.

In order to make the aforementioned and other objectives and advantages of the present invention comprehensible, embodiments accompanied with figures are described in detail below.

DESCRIPTION OF THE EMBODIMENTS

In order to make the content of the present invention more comprehensible, embodiments are described below as examples of implementation of the present invention. Wherever possible, the same reference numbers are used in the drawings and the description to refer to the same or like parts, components or steps.

Figure 1:
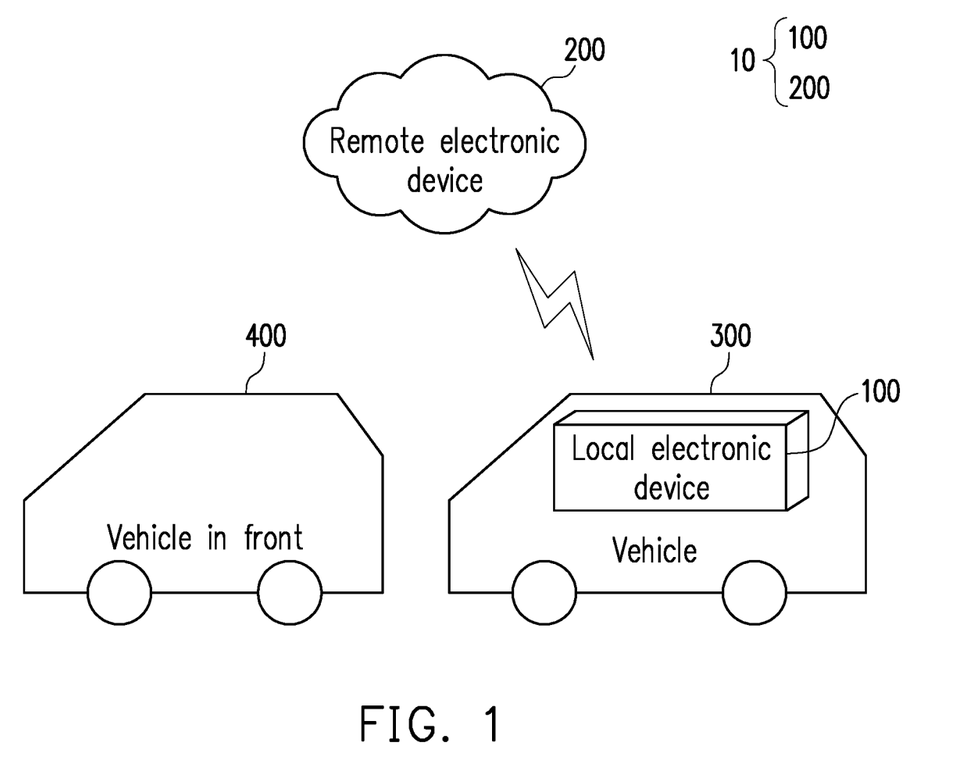
FIG. 1 is a schematic diagram of a vehicle using a driving alarm system according to an embodiment of the present invention.

FIG. 1 is a schematic diagram of a vehicle 300 using a driving alarm system 10 according to an embodiment of the present invention. The driving alarm system 10 comprises a local electronic device 100 and a remote electronic device 200, wherein the local electronic device 100 can be installed in the vehicle 300. The local electronic device 100 can upload relevant information of a vehicle in front 400 to the remote electronic device 200. The remote electronic device 200 can judge a dangerous level of the vehicle in front 400 according to relevant information of the vehicle in front 400 uploaded by the local electronic device 100 and uploaded by other local electronic devices installed in other vehicles. If the dangerous level of the vehicle in front 400 exceeds a threshold, the driving alarm system 10 may inform a driver of the vehicle 300 that the vehicle in front 400 is driven dangerously.

Figure 2:
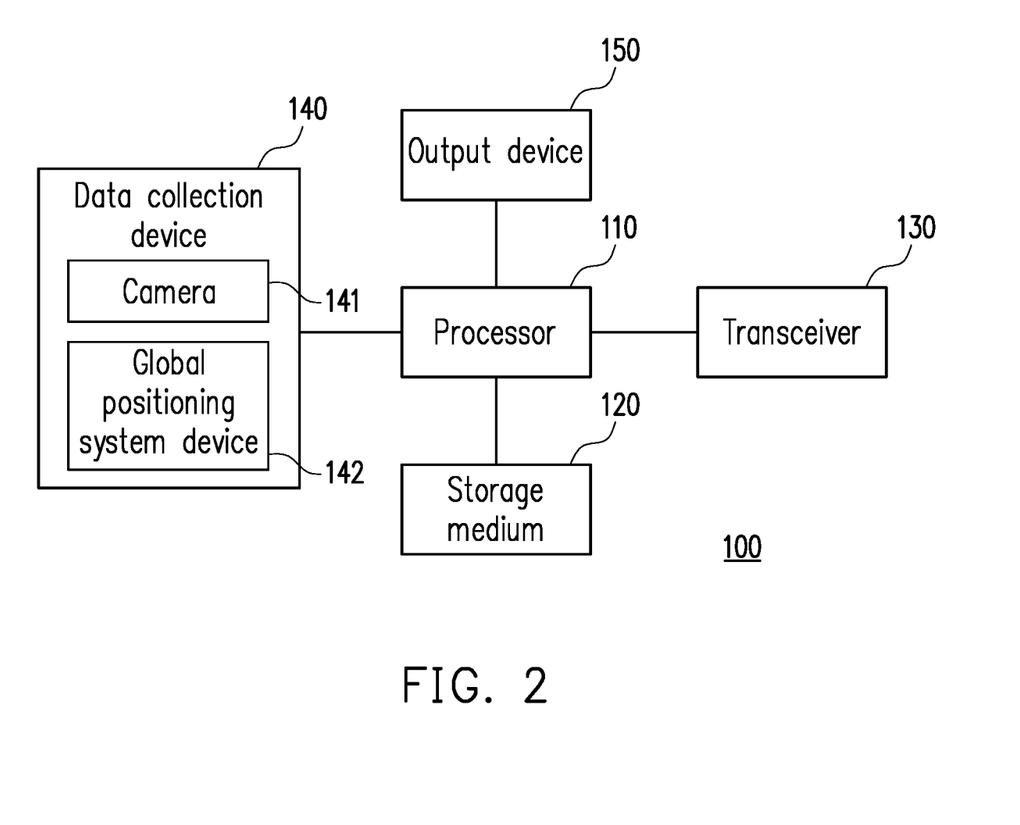
FIG. 2 is a schematic diagram of a local electronic device according to an embodiment of the present invention.

FIG. 2 is a schematic diagram of a local electronic device 100 according to an embodiment of the present invention. The local electronic device 100 comprises a processor 110, a storage medium 120, a transceiver 130, a data collection device 140, and an output device 150.

The processor 110 is, for example, a central processing unit (CPU), or other programmable general purpose or special purpose micro control unit (MCU), microprocessor, digital signal processor (DSP), programmable controller, application-specific integrated circuit (ASIC), graphics processing unit (GPU), arithmetic logic unit (ALU), complex programmable logic device (CPLD), field programmable gate array (FPGA) or other similar elements or combinations of the above elements. The processor 110 is coupled to the storage medium 120, the transceiver 130, the data collection device 140, and the output device 150.

The storage medium 120 is, for example, any type of fixed or removable random access memory (RAM), read-only memory (ROM), flash memory, hard disk drive (HDD), solid state drive (SSD), or similar elements or combinations of the above elements, for storing a plurality of modules or various application programs executable by the local electronic device 100 or the processor 110.

The transceiver 130 transmits or receives signals wirelessly. The transceiver 130 may also perform, for example, low noise amplification, impedance matching, mixing, up or down frequency conversion, filtering, amplification, and similar operations. The local electronic device 100 can communicate with the remote electronic device 200 through the transceiver 130.

The data collection device 140 comprises a camera 141 installed in the front of the vehicle 300. The camera 141 is used for capturing an image of the vehicle 400 located in front of the vehicle 300. In one embodiment, the data collection device 140 further comprises a global positioning system (GPS) device 142. The GPS device 142 is used for obtaining geographic location information of the vehicle 300 or the vehicle in front 400.

The output device 150 is, for example, a display (e.g., a head-up display or a liquid crystal display) or a loudspeaker, and the present invention is not limited thereto. When the driving alarm system 10 determines that the dangerous level of the vehicle 400 located in front of the vehicle 300 exceeds a threshold, the processor 110 of the local electronic device 100 can display or play a warning message through the output device 150 to remind the driver of the vehicle 300 to keep a distance from the vehicle in front 400.

Figure 3:
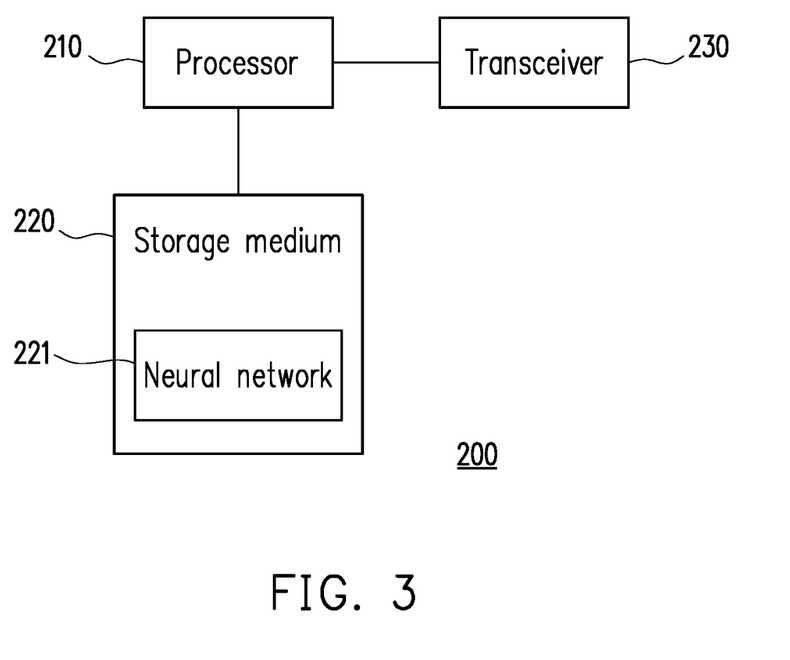
FIG. 3 is a schematic diagram of a remote electronic device according to an embodiment of the present invention.

FIG. 3 is a schematic diagram of a remote electronic device 200 according to an embodiment of the present invention. The remote electronic device 200 is, for example, a cloud server, and may comprise a processor 210, a storage medium 220, and a transceiver 230.

The processor 210 is, for example, a central processing unit, or other programmable general purpose or special purpose micro control unit, microprocessor, digital signal processor, programmable controller, application-specific integrated circuit, graphics processing unit, arithmetic logic unit, complex programmable logic device, field programmable logic gate array or other similar elements, or combinations of the above elements. The processor 210 is coupled to the storage medium 220 and the transceiver 230.

The storage medium 220 is, for example, any type of fixed or removable random access memory, read-only memory, flash memory, hard disk drive, solid state drive, or similar elements or combinations of the above elements, for storing a plurality of modules or various application programs executable by the remote electronic device 200 or the processor 210. The storage medium 220 may also store a neural network 221 for identifying whether a vehicle is driven dangerously. In the present embodiment, the neural network 221 is a convolutional neural network (CNN), but the present invention is not limited thereto.

The transceiver 230 transmits or receives signals wirelessly. The transceiver 230 may also perform, for example, low noise amplification, impedance matching, mixing, up or down frequency conversion, filtering, amplification, and similar operations. The remote electronic device 200 can communicate with the local electronic device 100 through the transceiver 230.

The local electronic device 100 may be installed in the vehicle 300. The processor 110 of the local electronic device 100 can obtain the driving trajectory of the vehicle in front 400 through the camera 141. Specifically, the processor 110 can recognize a license plate image of the vehicle in front 400 from an image obtained by the camera 141 by means of the image processing technology, and continuously track the license plate image through a detection area of the camera 141, thereby generating the driving trajectory corresponding to the vehicle in front 400.

Figure 4A:
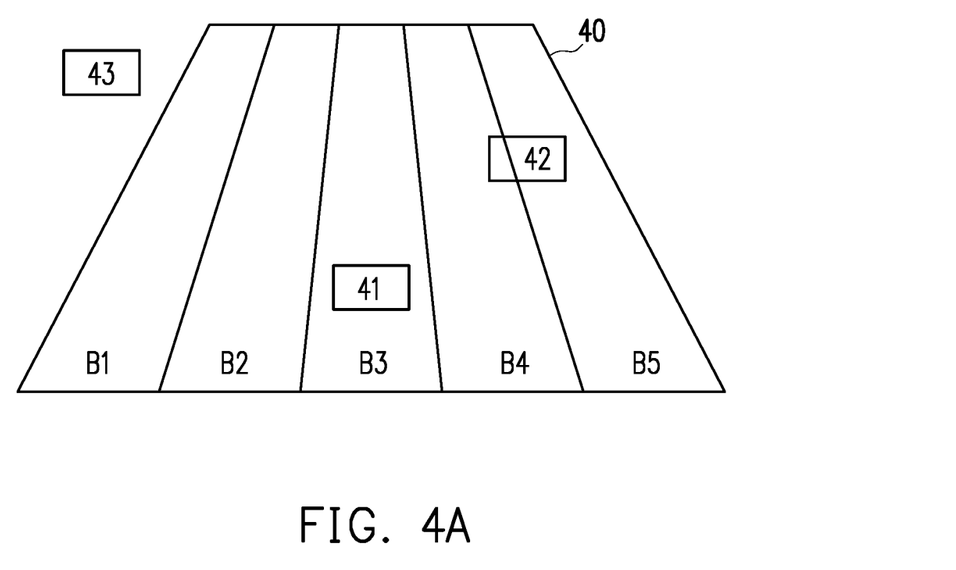
FIG. 4A is a schematic diagram of a detection area according to an embodiment of the present invention.

FIG. 4A is a schematic diagram of a detection area 40 according to an embodiment of the present invention. In the present embodiment, the detection area 40 of the camera 141 comprises five lanes, namely, lane B1, lane B2, lane B3, lane B4, and lane B5. The processor 110 can determine the lane in which a vehicle is located according to a position of a license plate image of the vehicle in the detection area 40. For example, if a vehicle corresponds to a license plate image 41, the processor 110 may determine that the vehicle is located in the lane B3 in response to the fact that the license plate image 41 is located in the lane B3. If a vehicle corresponds to a license plate image 42, the processor can determine that the vehicle is located in the lane B5 in response to the fact that most of the license plate image 42 is located in the lane B5. It should be noted that the quantity of lanes in the detection area 40 may be the same as or different from the actual quantity of lanes in the place where the vehicle 300 is located, and the present invention is not limited thereto.

In one embodiment, the processor 110 may determine that a lane closest to the license plate image is the lane where the vehicle is located in response to the fact that the license plate image of the vehicle is not within the detection area 40. For example, if a vehicle corresponds to a license plate image 43, the processor 110 may determine that the vehicle is located in the lane B1 which is closest to the license plate image 43 in response to the fact that the license plate image 43 is not within the detection area 40.

Figure 4B:
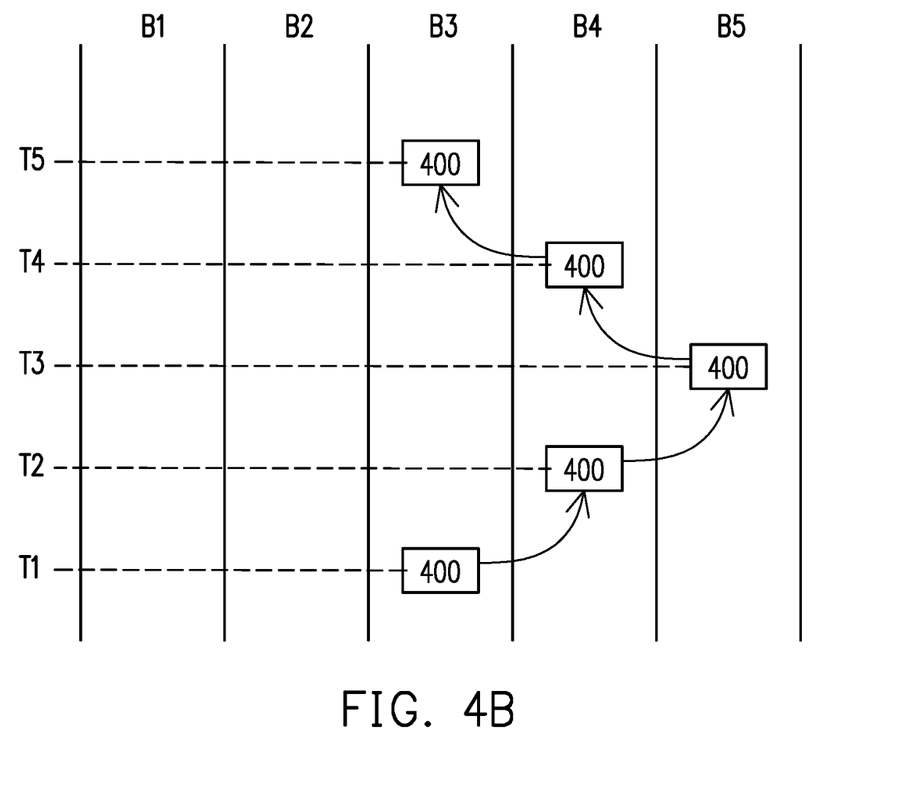
FIG. 4B is a schematic diagram of a driving trajectory of a vehicle in front according to an embodiment of the present invention.

FIG. 4B is a schematic diagram of the driving trajectory of the vehicle in front 400 according to an embodiment of the present invention, wherein the driving trajectory indicates the lane in which the vehicle in front 400 is located from an earlier time point T1 to a later time point T5. The processor 110 of the local electronic device 100 can detect the lanes (i.e., lanes B1, B2, B3, B4 and B5) where the vehicle in front 400 is located at different time points through the detection area 40 of the camera 141, so as to obtain the driving trajectory of the vehicle in front 400 as shown in FIG. 4B. Specifically, at time point T1, the processor 110 determines that the vehicle in front 400 is located in the lane B3 according to the image captured by the camera 141. Based on a similar method, the processor 110 may determine that the vehicle in front 400 switches from the lane B3 to the lane B4 at time point T2. At time point T3, the vehicle in front 400 switches from the lane B4 to the lane B5. At time point T4, the vehicle in front 400 switches from the lane B5 to the lane B4. At time point T5, the vehicle in front 400 switches from the lane B4 to the lane B3. Assuming that time points T1-T5 are a short period of time, the driving trajectory of the vehicle in front 400 indicates that the vehicle in front 400 switches lanes frequently in a short time. In other words, the vehicle in front 400 is driven dangerously.

After obtaining the driving trajectory of the vehicle in front 400, the processor 110 of the local electronic device 100 can generate a driving trajectory matrix according to the driving trajectory. Next, the local electronic device 100 can upload the driving trajectory matrix to the remote electronic device 200 through the transceiver 130, so that the remote electronic device 200 can judge the dangerous level of the vehicle in front 400 according to the driving trajectory matrix. The driving trajectory matrix is associated with a plurality of time points and the lanes where the vehicle in front 400 is located at the plurality of time points. For example, the driving trajectory shown in FIG. 4B can be converted into the driving trajectory matrix 51 shown in FIG. 5 by the processor 110. In the present embodiment, the $i^{th}$ row of the driving trajectory matrix 51 corresponds to the time point $T(|i-(m+1)|)$ in FIG. 4B, and the $j^{th}$ column of the driving trajectory matrix 51 corresponds to the lane B(j) in FIG. 4B, wherein m represents the quantity of rows of the driving trajectory matrix 51 (i.e., m=5). For example, at time point T1, the vehicle in front 400 is located in the lane B3. Therefore, the processor 110 fills "1" representing the location of the vehicle in front 400 in the fifth row (corresponding to the time point T1) and the third column (corresponding to the lane B3) of the driving trajectory matrix 51, and conducts zerofilling on the other columns in the fifth row of the driving trajectory matrix 51.

Figure 5:
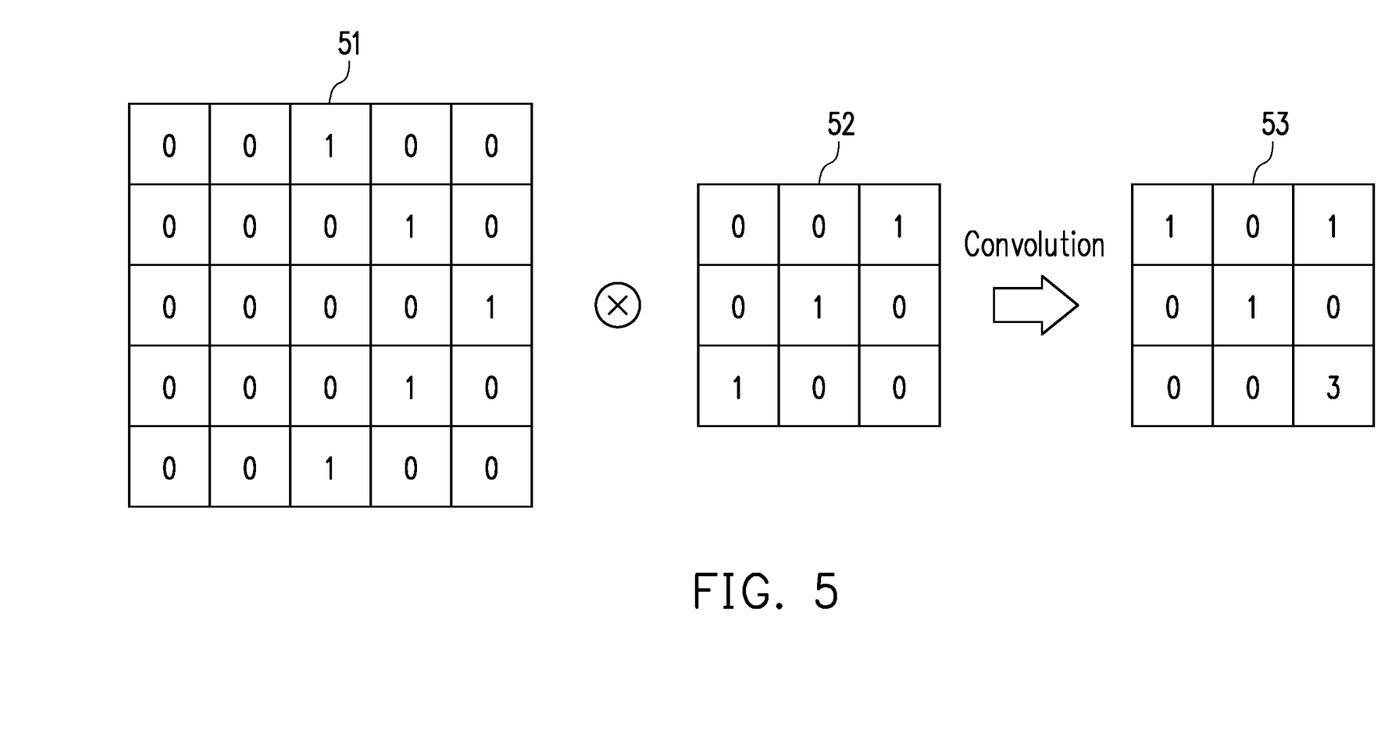
FIG. 5 is a schematic diagram illustrating the conversion of a driving trajectory matrix into a feature map by a neural network according to an embodiment of the present invention.

The size of the driving trajectory matrix 51 can be dynamically adjusted. If the driving alarm system 10 wants the remote electronic device 200 to judge the dangerous level of the vehicle in front 400 according to longer-term information, the processor 110 of the local electronic device 100 can increase more rows to the driving trajectory matrix 51 so that the driving trajectory matrix 51 is associated with more time points. In other words, the processor 110 may increase a time pane for sampling elements in the driving trajectory matrix 51. In contrast, if the driving alarm system 10 wants the remote electronic device 200 to judge the dangerous level of the vehicle in front 400 according to shorter-term information, the processor 110 of the local electronic device 100 can reduce the rows of the driving trajectory matrix 51 so that the driving trajectory matrix 51 is associated with fewer time points. In other words, the processor 110 may reduce the time pane for sampling elements in the driving trajectory matrix 51. For example, the processor 110 may reduce the rows of the driving trajectory matrix 51 to adjust the driving trajectory matrix 51 to the 4×5 driving trajectory matrix shown in Table 1. In this way, the driving trajectory matrix 51 includes only the information of the time points T2 to T5, and does not include the information of the earliest time point T1.

TABLE 1

| 0 | 0 | 1 | 0 | 0 |
| 0 | 0 | 0 | 1 | 0 |
| 0 | 0 | 0 | 0 | 1 |
| 0 | 0 | 0 | 1 | 0 |

On the other hand, the quantity of columns in the driving trajectory matrix 51 is the quantity of lanes included in the detection area 40. In other words, when a preset size of the detection area 40 is different, the quantity of columns of the driving trajectory matrix 51 generated by the processor 110 will also be different.

After generating the driving trajectory matrix 51, the processor 110 of the local electronic device 100 can upload the driving trajectory matrix 51 to the remote electronic device 200 through the transceiver 130 together with relevant information, wherein the relevant information may include the license plate information of the vehicle in front 400, a time stamp corresponding to the time point associated with the driving trajectory matrix 51, the geographic location information of the vehicle 300 or the vehicle in front 400, an identification code of the local electronic device 100 and other information. Since the remote electronic device 200 can receive data uploaded from different local electronic devices, the remote electronic device 200 needs to determine that an uploader of the driving trajectory matrix 51 is the local electronic device 100 through the identification code of the local electronic device 100. In order to protect the privacy of the vehicle in front 400, the license plate information of the vehicle in front 400 needs to be presented in the form of a hash value. The processor 110 of the local electronic device 100 needs to establish a corresponding hash value according to the license plate image of the vehicle in front 400. The local electronic device 100 can indicate the identity of the vehicle in front 400 without violating the privacy of the vehicle in front 400 by uploading the hash value to the remote electronic device 200.

The processor 210 of the remote electronic device 200 can receive the driving trajectory matrix 51 and the aforementioned related information through the transceiver 230. Next, the processor 210 can determine the dangerous level of the vehicle in front 400 according to the driving trajectory matrix 51 and the neural network 221. More specifically, in addition to the driving trajectory matrix 51, the processor 210 determines the dangerous level of the vehicle in front 400 according to other driving trajectory matrices corresponding to the vehicle in front 400 and different from the driving trajectory matrix 51. The other driving trajectory matrices are uploaded by, for example, local electronic devices installed in other vehicles instead of the vehicle 300.

The processor 210 can determine whether the vehicle in front 400 is driven dangerously according to the driving trajectory matrix 51 and the neural network 221. FIG. 5 is a schematic diagram illustrating the conversion of the driving trajectory matrix 51 into a feature map 53 by the neural network 221 according to an embodiment of the present invention. A convolution layer of the neural network 221 may use a convolution kernel 52 to convolve the driving trajectory matrix 51 to generate the feature map 53. The convolution kernel 52 is, for example, a matrix representing one of the types of dangerous driving trajectories, but the present invention is not limited thereto. For example, the convolution kernel 52 may be a matrix representing one of the types of normal (safe) driving trajectories. In the present embodiment, the (i,j)$^{th}$ element C(i,j) of the feature map 53 is shown by Equation (1):

$$C(i,j)=\Sigma_{x=i}^{i+(m-1)}\Sigma_{y=j}^{j+(n-1)}A(x,y)B(x-i+1,y-j+1) \quad \text{Equation (1)},$$

wherein "m" is the quantity of rows of the convolution kernel 52 (i.e., m=3), "n" is the quantity of columns of the convolution kernel 52 (i.e., n=3), "A(x, y)" represents the (x, y)$^{th}$ element of the driving trajectory matrix 51, and "B(x, y)" represents the (x, y)$^{th}$ element of the convolution kernel 52.

Figure 6:
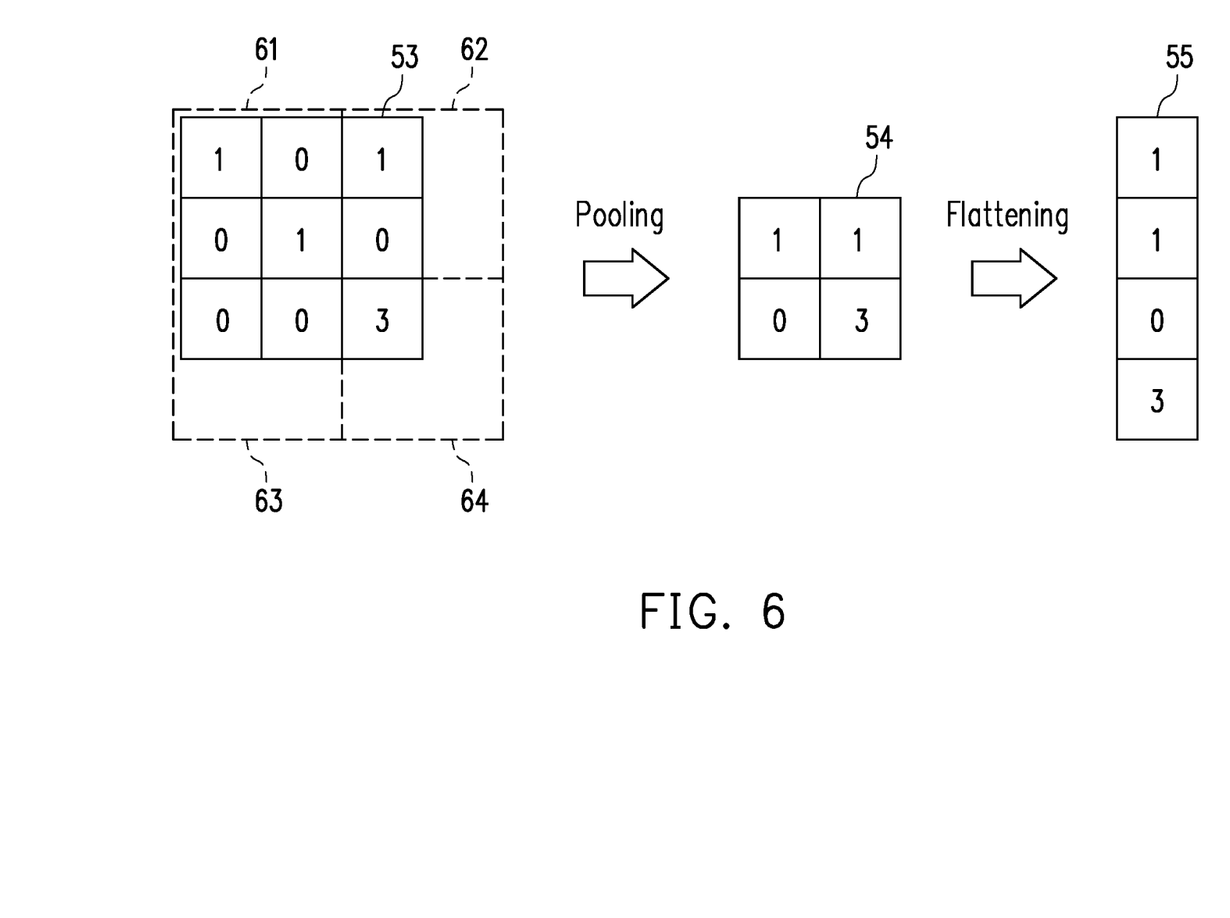
FIG. 6 is a schematic diagram illustrating pooling and flattening of a feature map by a neural network according to an embodiment of the present invention.

After obtaining the feature map 53, the neural network 221 can reduce the dimension of the feature map 53 to make the calculation process more efficient. FIG. 6 is a schematic diagram illustrating pooling and flattening of the feature map 53 by the neural network 221 according to an embodiment of the present invention. A pooling layer of the neural network 221 may implement max pooling on the feature map 53 to reduce the dimension of the feature map 53. For example, the pooling layer can divide the feature map 53 into several sub-regions, namely sub-region 61, sub-region 62, sub-region 63 and sub-region 64. Next, the pooling layer can extract the maximum value in each sub-region to generate a feature map 54 with a low dimension. Before inputting the feature map 54 to a full connection layer of the neural network 221, the neural network 221 may conduct flattening on the feature map 54 to generate a one-dimensional feature map 55.

Figure 7:
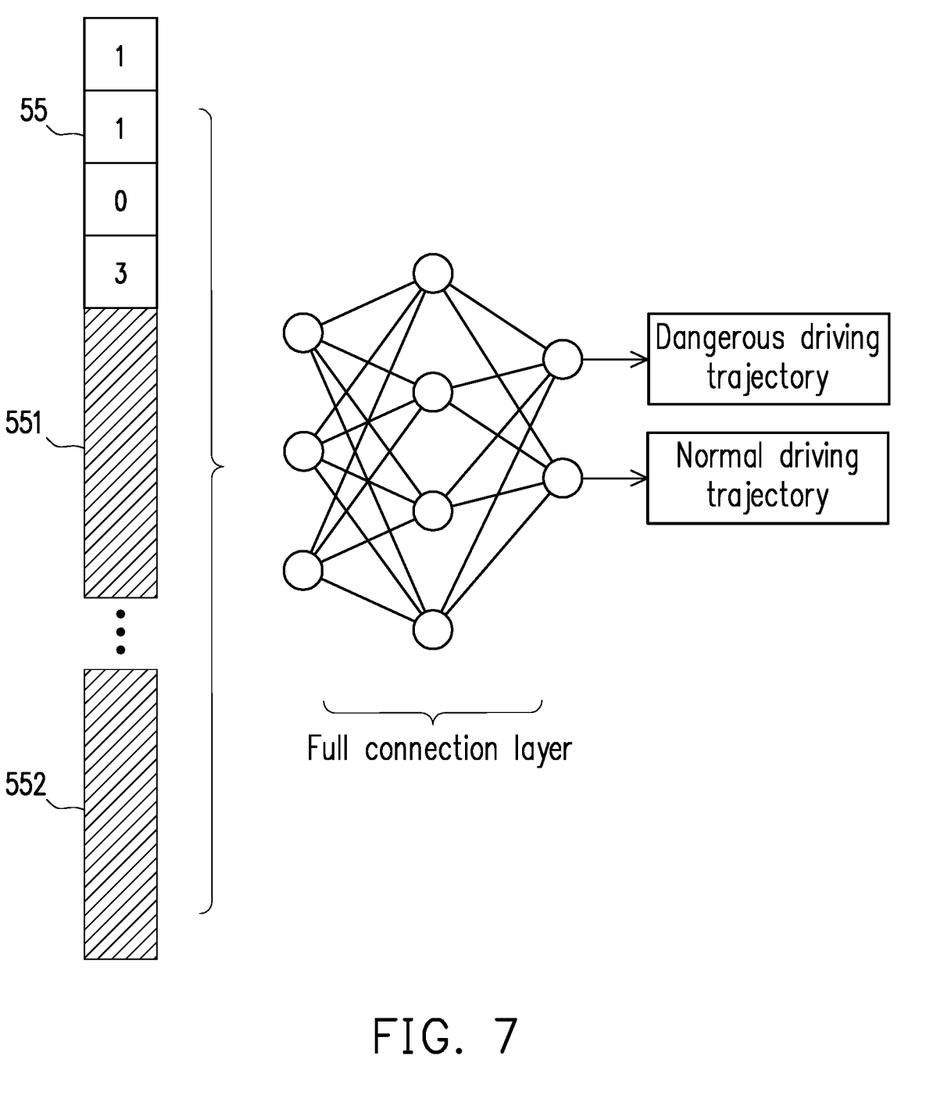
FIG. 7 is a schematic diagram showing a neural network judging whether a vehicle in front is driven dangerously according to an embodiment of the present invention.

FIG. 7 is a schematic diagram showing the neural network 221 judging whether the vehicle in front 400 is driven dangerously according to an embodiment of the present invention. The neural network 221 can input the one-dimensional feature map 55 to the full connection layer, thereby classifying the driving trajectory of the vehicle in front 400 into a dangerous driving trajectory or a normal driving trajectory by using a judgment result of the full connection layer, and further calculating the dangerous level of the vehicle in front 400. In another embodiment, there are multiple layers of neurons in the full connection layer, and the one-dimensional feature map 55 is classified as a dangerous driving trajectory or a normal driving trajectory by each neuron in the full connection layer. In one embodiment, each neuron can judge the degree of similarity between the one-dimensional feature map 55 and the dangerous driving trajectory or the normal driving trajectory, give a similarity score, and conduct classification according to the similarity score. In the present embodiment, the plurality of neurons in the full connection layer can be trained in advance into neurons which extract relevant features from the one-dimensional feature map 55 to judge whether the driving trajectory of the vehicle in front 400 is similar to the dangerous driving trajectory. In another embodiment, the plurality of neurons can be trained in advance into neurons which extract relevant features from the one-dimensional feature map 55 to judge whether the driving trajectory of the vehicle in front 400 is similar to the normal driving trajectory.

It is worth noting that the one-dimensional feature map 55 only corresponds to a single convolution kernel 52. In other words, the neural network 221 can only recognize a single type of dangerous driving trajectory according to the one-dimensional feature map 55. In order to make the judgment result of the neural network 221 more accurate, the neural network 221 needs to convolve the driving trajectory matrix 51 with convolution kernels representing different types of dangerous driving trajectories to generate a plurality of corresponding one-dimensional feature maps.

Figure 8A:
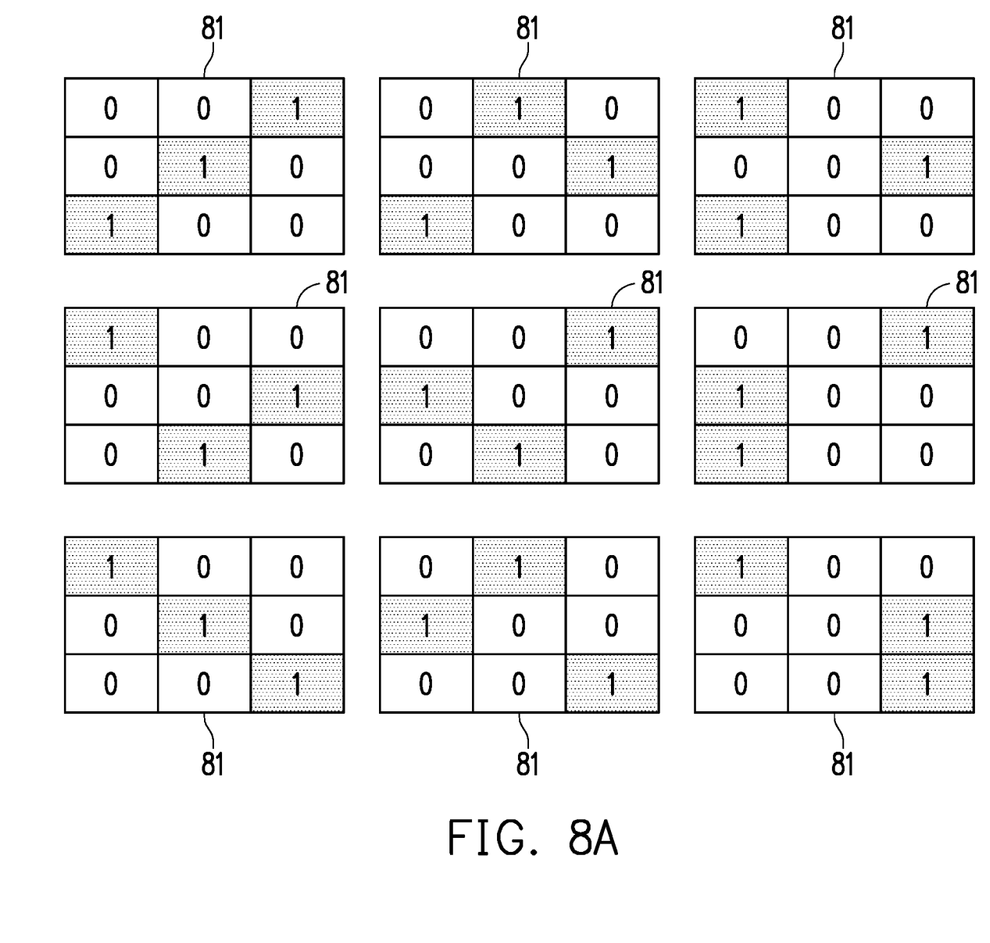
FIG. 8A is a schematic diagram of a convolution kernel corresponding to a dangerous driving trajectory according to an embodiment of the present invention.
Figure 8B:
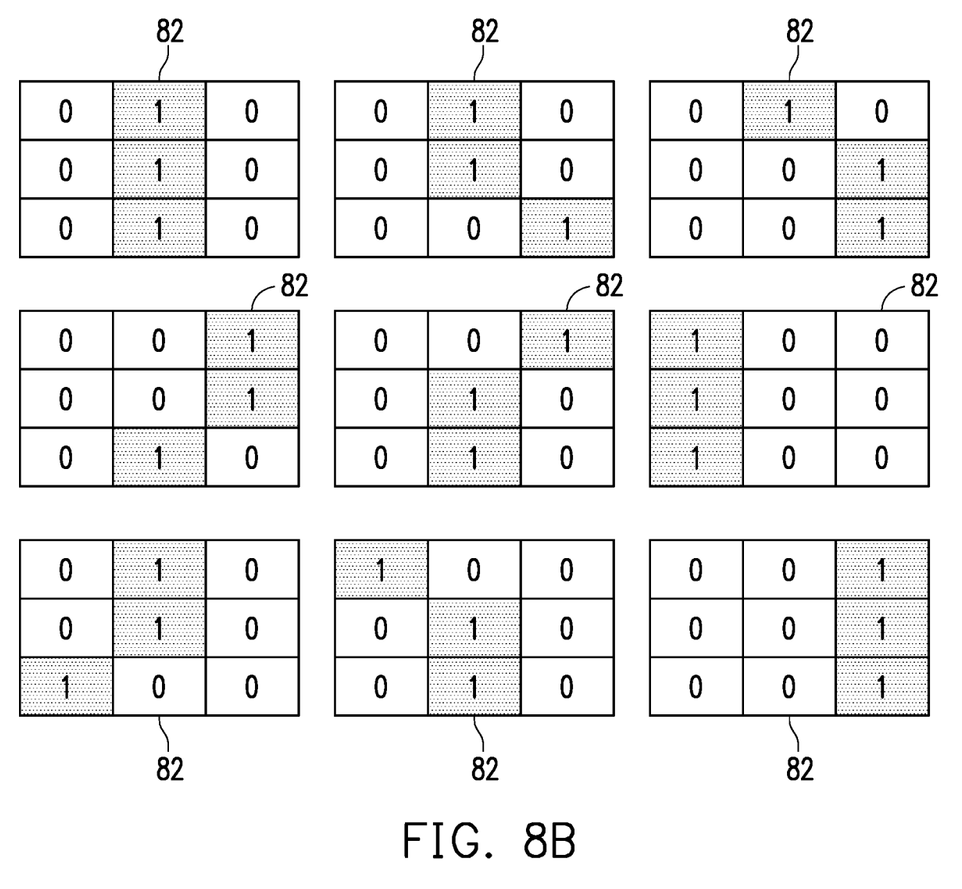
FIG. 8B is a schematic diagram of a convolution kernel corresponding to a normal driving trajectory according to an embodiment of the present invention.

FIG. 8A is a schematic diagram of convolution kernels corresponding to dangerous driving trajectories according to an embodiment of the present invention. For example, the neural network 221 may convolve the driving trajectory matrix 51 using two of the plurality of convolution kernels 81 corresponding to the dangerous driving trajectories shown in FIG. 8A to generate a one-dimensional feature map 551 and a one-dimensional feature map 552, respectively. FIG. 8B is a schematic diagram of convolution kernels corresponding to normal driving trajectories according to an embodiment of the present invention. In one embodiment, the neural network 221 may convolve the driving trajectory matrix 51 using three of the plurality of convolution kernels 82 corresponding to the normal driving trajectories shown in FIG. 8B to generate a one-dimensional feature map 55, a one-dimensional feature map 551 and a one-dimensional feature map 552, respectively.

The neural network 221 can generate a plurality of judgment results corresponding to a plurality of driving trajectory matrices respectively according to the plurality of driving trajectory matrices uploaded by different local electronic devices (including the local electronic device 100 and other local electronic devices having the same functions as the local electronic device 100). Then, the neural network 221 can calculate the dangerous level of the vehicle in front 400 according to the plurality of judgment results. In other words, the neural network 221 judges the dangerous level of the vehicle in front 400 according to a plurality of driving trajectories of the vehicle in front 400 observed by different vehicles. The neural network 221 can calculate the dangerous level of the vehicle in front 400 according to Equation (2), $$DL = \frac{DT}{DN} \times 100\%, \quad \text{Equation (2)}$$

wherein DL is the dangerous level, DT is the quantity of judgment results corresponding to the dangerous driving trajectory, and DN is the quantity of all judgment results (including judgment results corresponding to the dangerous driving trajectory or the normal driving trajectory).

For example, assuming that the remote electronic device 200 receives driving trajectory matrices uploaded by local electronic devices in other vehicles in addition to the driving trajectory matrix 51 uploaded by the local electronic device 100 in the vehicle 300, the remote electronic device 200 can generate a plurality of judgment results corresponding to different driving trajectory matrices respectively through the neural network 221, as shown in Table 2.

TABLE 2

| Time stamp | Uploader of driving trajectory matrix | Target identity | Judgment result |
|---|---|---|---|
| 09:09 | Vehicle C | Vehicle in front 400 | Dangerous driving trajectory |
| 9:10 AM | Vehicle A | Vehicle in front 400 | Dangerous driving trajectory |

TABLE 2-continued

| Time stamp | Uploader of driving trajectory matrix | Target identity | Judgment result |
| --- | --- | --- | --- |
| 09:11 | Vehicle B | Vehicle in front 400 | Dangerous driving trajectory |
| 09:12 | Vehicle C | Vehicle in front 400 | Normal driving trajectory |
| 09:13 | Vehicle 300 | Vehicle in front 400 | Dangerous driving trajectory |

The processor 210 of the remote electronic device 200 can determine the quantity of judgment results for calculating the dangerous level according to a preset time window. For example, assuming that the time window is preset to "3", the processor 210 calculates the dangerous level DL of the vehicle in front 400 according to three newly uploaded judgment results (i.e., the judgment results corresponding to the time stamps 09:11, 09:12 and 09:13 respectively), as shown in Equation (3), $$DL = 2/3 \times 100\% = 66.67\% \qquad \text{Equation (3),}$$

wherein "2" represents the quantity of the judgment results corresponding to the time stamps 09:11 and 09:13 respectively (i.e., the judgment results corresponding to dangerous driving trajectories), and "3" represents the quantity of the judgment results corresponding to the time stamps 09:11 to 09:13 respectively.

The processor 210 of the remote electronic device 200 may transmit a warning message to the local electronic device 100 through the transceiver 230 based on the dangerous level DL exceeding a threshold (e.g., 50%). In one embodiment, the processor 210 of the remote electronic device 200 may transmit the dangerous level DL to the local electronic device 100 through the transceiver 230.

In one embodiment, the judgment results corresponding to the same uploader may be included in the time window. For example, if the time window is preset to "5", the uploaders corresponding to the time stamps 09:09 and 09:12 in the time window are both vehicle C, wherein the judgment result corresponding to the time stamp 09:09 is calculated according to the driving trajectory matrix uploaded earlier by the vehicle C, and the judgment result corresponding to the time stamp 09:12 is calculated according to the driving trajectory matrix uploaded later by the vehicle C. In this case, the processor 210 will treat the driving trajectory matrix uploaded earlier or the corresponding judgment result as invalid data, and preferentially calculate the dangerous level according to the driving trajectory matrix generated at a later time point. Therefore, before calculating the dangerous level of the vehicle in front 400, the processor 210 will first determine that the judgment result corresponding to 09:09 in the time window is invalid data. Accordingly, the processor 210 will calculate the dangerous level based on only four judgment results (i.e., judgment results corresponding to time stamps 09:10, 09:11, 09:12, and 09:13, respectively).

In one embodiment, the storage medium 220 of the remote electronic device 200 may prestore the historical driving record of the vehicle in front 400. When the processor 210 of the remote electronic device 200 needs to calculate the dangerous level of the vehicle in front 400, the processor 210 can calculate the dangerous level according to the historical driving record, so that the calculated dangerous level is more accurate. On the other hand, the processor 210 may directly determine the dangerous level of the vehicle in front 400 from the historical driving record of the vehicle in front 400. In this way, the process of calculating the dangerous level can be omitted, and the processor 210 can judge the dangerous level of the vehicle in front 400 more quickly.

In one embodiment, after the remote electronic device 200 receives the geographic location information corresponding to the vehicle in front 400 from the local electronic device 100, the remote electronic device 200 may transmit a warning message to the local electronic device 100 through the transceiver 230 in response to the geographic location information corresponding to the vehicle in front 400 having a dangerous driving record associated with the vehicle in front 400. Then, the processor 110 of the local electronic device 100 can output the warning message through the output device 150 to remind the driver to pay attention to the vehicle in front 400. In other words, the driving alarm system 10 can determine whether to transmit a warning message according to various factors such as the dangerous level or dangerous driving record of the vehicle in front 400. In one embodiment, the processor 110 may output the warning message in different ways based on different dangerous levels. For example, if the dangerous level is high (for example, higher than 75%), the output device 150 may transmit a red light signal to remind the driver to pay attention to the vehicle in front 400. If the dangerous level is low (for example, between 25% and 75%), the output device 150 may transmit a yellow light signal to remind the driver to pay attention to the vehicle in front 400.

Figure 9:
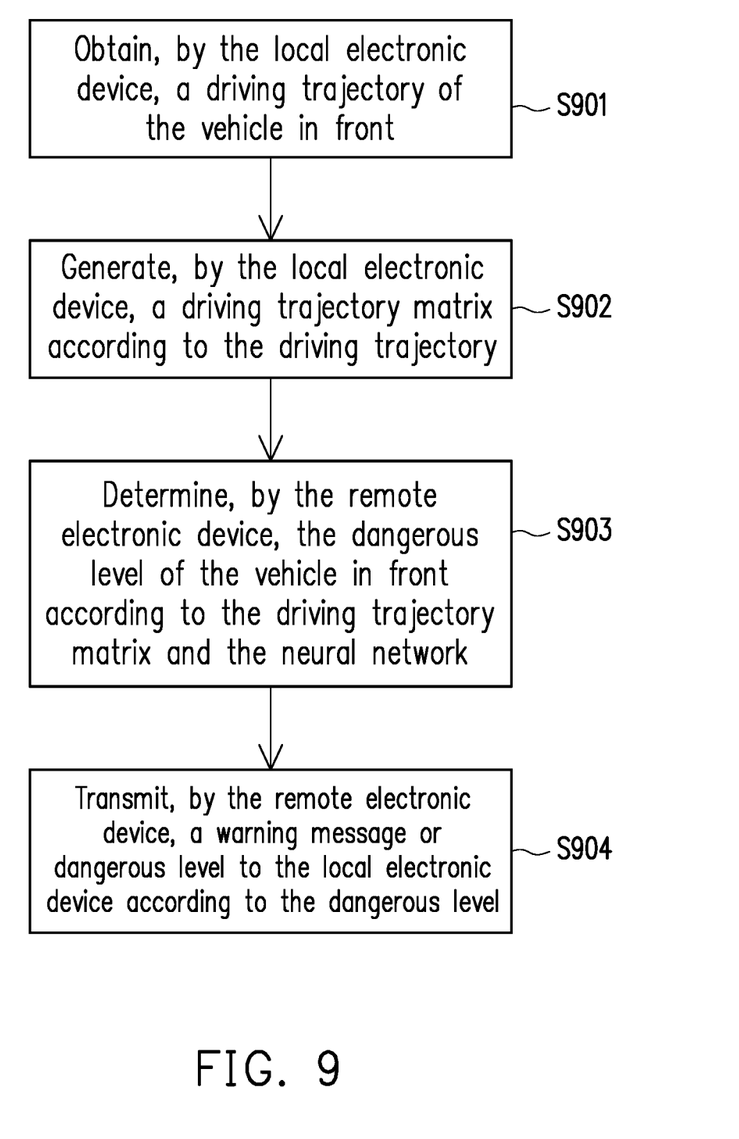
FIG. 9 is a flow chart of a driving alarm method according to an embodiment of the present invention.

FIG. 9 is a schematic diagram of a driving alarm method according to an embodiment of the present invention, wherein the driving alarm method can be implemented by at least one of the driving alarm system 10, the local electronic device 100 or the remote electronic device 200 shown in FIG. 1. In step S901, the local electronic device obtains a driving trajectory of the vehicle in front. In step S902, the local electronic device generates a driving trajectory matrix according to the driving trajectory. In step S903, the remote electronic device determines the dangerous level of the vehicle in front according to the driving trajectory matrix and the neural network. In step S904, the remote electronic device transmits a warning message or dangerous level to the local electronic device according to the dangerous level.

Figure 10:
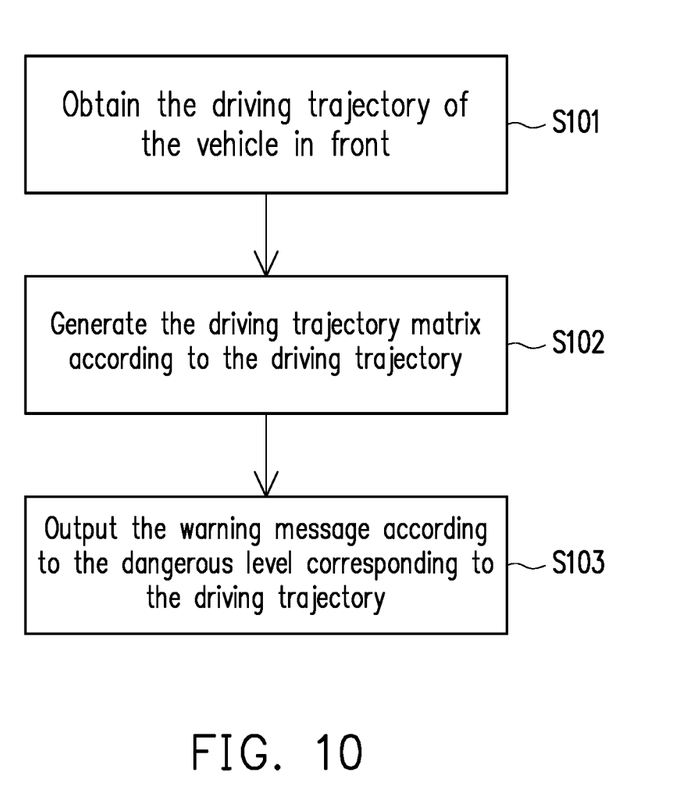
FIG. 10 is a flow chart of a driving alarm method according to an embodiment of the present invention.

FIG. 10 is a flow chart of a driving alarm method according to an embodiment of the present invention, wherein the driving alarm method can be implemented by a local electronic device 100 shown in FIG. 2. In step S101, the driving trajectory of the vehicle in front are obtained. In step S102, the driving trajectory matrix is generated according to the driving trajectory. In step S103, the warning message is outputted according to the dangerous level corresponding to the driving trajectory.

To sum up, the embodiments of driving alarm method of the present invention enables the vehicle to accurately judge the driving trajectory of the vehicle in front through the image recognition technology, and upload the information related to the driving trajectory to the remote electronic device (e.g., cloud server). The remote electronic device can determine the dangerous level of the vehicle in front through the neural network and the information, and transmit the warning message to the driver of the vehicle when the dangerous level is too high, so as to remind the driver to keep an appropriate distance from the vehicle in front. The information related to the driving trajectory can be simply presented in a matrix form. In this way, the local electronic device in the vehicle and the remote electronic device can exchange the information related to driving trajectory at a faster rate, and the remote electronic device can quickly calculate the dangerous level with less computation.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A driving alarm method, suitable for a local electronic device in a vehicle, comprising:
   obtaining a driving trajectory of a vehicle in front;
   generating a driving trajectory matrix according to the driving trajectory, wherein the driving trajectory matrix is associated with a plurality of time points and lanes where the vehicle in front is located at the plurality of time points, a first row of the driving trajectory matrix corresponds to a first time point of the plurality of time points, a first column of the driving trajectory matrix corresponds to a first lane of the lanes, wherein an element corresponding to the first row and the first column is filled with "1" in response to the vehicle in front being in the first lane at the first time point, and the element is filled with "0" in response to the vehicle in front not being in the first lane at the first time point; and
   outputting a warning message according to a dangerous level corresponding to the driving trajectory matrix.

2. The driving alarm method according to claim 1, further comprising:
   determining, by a remote electronic device, the dangerous level of the vehicle in front according to the driving trajectory matrix, comprising:
   convolving the driving trajectory matrix with a convolution kernel to generate a feature map;
   calculating the dangerous level according to the feature map; and
   transmitting the dangerous level or the warning message to the local electronic device.

3. The driving alarm method according to claim 1, wherein the step of obtaining the driving trajectory of the vehicle in front comprises:
   in response to a license plate image of the vehicle in front is not in a detection area, determining that a lane closest to the license plate image is a first second lane where the vehicle in front is located.

4. The driving alarm method according to claim 2, wherein the step of determining, by the remote electronic device, the dangerous level of the vehicle in front according to the driving trajectory matrix further comprises:
   obtaining a second driving trajectory matrix corresponding to the vehicle in front; and
   determining the dangerous level of the vehicle in front according to the driving trajectory matrix, the second driving trajectory matrix and a neural network.

5. The driving alarm method according to claim 4, wherein the step of determining the dangerous level of the vehicle in front according to the driving trajectory matrix, the second driving trajectory matrix and the neural network comprises:
   generating a plurality of judgment results corresponding to a plurality of driving trajectory matrices respectively by the neural network, wherein the plurality of driving trajectory matrices comprise the driving trajectory matrix and the second driving trajectory matrix, and the second driving trajectory matrix obtained from a second vehicle different from the vehicle;
   counting a quantity of judgment results corresponding to dangerous driving trajectories as the numerator of the dangerous level; and
   counting a quantity of the plurality of judgment results as the denominator of the dangerous level.

6. The driving alarm method according to claim 4, wherein the step of determining the dangerous level of the vehicle in front according to the driving trajectory matrix, the second driving trajectory matrix and the neural network comprises:
   in response to the driving trajectory matrix and the second driving trajectory matrix are generated by the same vehicle, preferentially calculating the dangerous level according to the driving trajectory matrix or the second driving trajectory matrix generated at a later time point.

7. The driving alarm method according to claim 1, further comprising:
   transmitting the warning message in response to geographic location information corresponding to the vehicle in front having an associated dangerous driving record.

8. The driving alarm method according to claim 1, further comprising:
   obtaining a license plate image of the vehicle in front;
   establishing a hash value corresponding to the license plate image; and
   uploading the hash value to a remote electronic device to identify the vehicle in front.

9. The driving alarm method according to claim 1, wherein the step of obtaining the driving trajectory of the vehicle in front comprises:
   tracking a license plate image of the vehicle in front to generate the driving trajectory.

10. A driving alarm system, comprising:
    a local electronic device; and
    a remote electronic device, wherein
    the local electronic device obtains a driving trajectory of a vehicle in front, generates a driving trajectory matrix according to the driving trajectory, and uploads the driving trajectory matrix to the remote electronic device, wherein the driving trajectory matrix is associated with a plurality of time points and lanes where the vehicle in front is located at the plurality of time points a first row of the driving trajectory matrix corresponds to a first time point of the plurality of time points, a first column of the driving trajectory matrix corresponds to a first lane of the lanes, wherein an element corresponding to the first row and the first column is filled with "1" in response to the vehicle in front being in the first lane at the first time point, and the element is filled with "0" in response to the vehicle in front not being in the first lane at the first time point, wherein
    the remote electronic device determines a dangerous level of the vehicle in front according to the driving trajectory matrix and a neural network, and outputs a warning message or the dangerous level to the local electronic device according to the dangerous level.

11. The driving alarm system according to claim 10, wherein the remote electronic device convolves the driving trajectory matrix with a convolution kernel to generate a feature map, calculates the dangerous level according to the feature map, and transmits the dangerous level or the warning message to the local electronic device.

12. The driving alarm system according to claim 11, wherein the remote electronic device obtains a second driving trajectory matrix corresponding to the vehicle in front, and determines the dangerous level of the vehicle in front according to the driving trajectory matrix, the second driving trajectory matrix and the neural network.

13. The driving alarm system according to claim 10, wherein the local electronic device obtains a license plate image of the vehicle in front, establishes a hash value corresponding to the license plate image, uploads the hash value to the remote electronic device to identify the vehicle in front, and transmits the warning message in response to geographic location information corresponding to the vehicle in front having an associated dangerous driving record.

14. A driving alarm electronic device, comprising:
a transceiver;
an output device;
a data collection device; and
a processor, coupled to the transceiver, the output device and the data collection device, wherein the processor is configured to:
  obtain a driving trajectory of a vehicle in front through the data collection device;
  generate a driving trajectory matrix according to the driving trajectory, wherein the driving trajectory matrix is associated with a plurality of time points and lanes where the vehicle in front is located at the plurality of time points, a first row of the driving trajectory matrix corresponds to a first time point of the plurality of time points, a first column of the driving trajectory matrix corresponds to a first lane of the lanes, wherein an element corresponding to the first row and the first column is filled with "1" in response to the vehicle in front being in the first lane at the first time point, and the element is filled with "0" in response to the vehicle in front not being in the first lane at the first time point;
  upload the driving trajectory matrix and receive a dangerous level or warning message corresponding to the vehicle in front through the transceiver; and
  output the dangerous level or warning message through the output device.

15. The electronic device according to claim 14, wherein the processor, in response to a license plate image of the vehicle in front is not in a detection area, determines that a lane closest to the license plate image is a second lane where the vehicle in front is located.

16. The electronic device according to claim 14, wherein the processor transmits the warning message through the output device in response to geographic location information corresponding to the vehicle in front having an associated dangerous driving record.

17. The electronic device according to claim 14, wherein the processor is further configured to:
  obtain a license plate image of the vehicle in front through the data collection device;
  establish a hash value corresponding to the license plate image; and
  upload the hash value to a remote electronic device through the transceiver to identify the vehicle in front.

18. The electronic device according to claim 14, wherein the processor tracks a license plate image of the vehicle in front through the data collection device to generate a driving trajectory.

* * * * *